(12) United States Patent  
Bendert et al.

(10) Patent No.: US 12,386,729 B2  
(45) Date of Patent: *Aug. 12, 2025

(54) SOFTWARE DEPENDENCY MANAGEMENT AND TESTING SYSTEM

(71) Applicant: Wells Fargo Bank, N.A., San Francisco, CA (US)

(72) Inventors: David P. Bendert, Charlotte, NC (US); Jason Franklin Frye, Monroe, NC (US); Maximilian Fuchs, Charlotte, NC (US); Jennifer Marie Giannoulis, Waxhaw, NC (US); Magesh Punniyamoorthy, Charlotte, NC (US); Matthew O. Spain, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 149 days.

This patent is subject to a terminal disclaimer.

(21) Appl. No.: 18/295,549

(22) Filed: Apr. 4, 2023

(65) Prior Publication Data

US 2024/0338310 A1 Oct. 10, 2024

(51) Int. Cl.
*G06F 11/3668* (2025.01)
*G06F 11/3698* (2025.01)

(52) U.S. Cl.
CPC ........ *G06F 11/3688* (2013.01); *G06F 11/368* (2013.01); *G06F 11/3698* (2025.01)

(58) Field of Classification Search
CPC ....................................................... G06F 11/36
USPC ......................................................... 717/124
See application file for complete search history.

(56) References Cited

U.S. PATENT DOCUMENTS

| 8,145,471 | B2 | 3/2012 | Beyer et al. |
| 8,175,863 | B1 | 5/2012 | Ostermeyer et al. |
| 8,244,853 | B1 | 8/2012 | Raanan |
| 8,458,695 | B2 | 6/2013 | Fitzgerald et al. |
| 8,725,871 | B2 | 5/2014 | Ding et al. |
| 8,813,065 | B2 | 8/2014 | Zygmuntowicz et al. |

(Continued)

OTHER PUBLICATIONS

Bhowate, Pranali K., "A Review of Runtime Software Testing of a Systems Migrate to The Cloud With a Taas Environment", International Journal of Engineering Research and Technology vol. 2 Issue 2, (Feb. 2013), 7 pgs.

(Continued)

*Primary Examiner* — Ziaul A Chowdhury
(74) *Attorney, Agent, or Firm* — SCHWEGMAN LUNDBERG & WOESSNER, P.A.

(57) ABSTRACT

Disclosed in some examples are methods, systems, devices, and machine-readable mediums for managing the testing of software component dependencies. In some examples, the system may track versions of dependencies; provide an interface to create a customized testing environment—e.g., such as by allowing a user to select whether to include a particular dependency and what version of that dependency to include; select test scripts; select test environments; and automate tests of the selected versions. The system may log test results that can be used for proof of regulatory compliance. In some examples, the system may automate the testing of new dependency versions. For example, a new version of a dependency may automatically be tested by the system using one or more test scripts. The results may then be presented to one or more users.

18 Claims, 6 Drawing Sheets

(56) References Cited

U.S. PATENT DOCUMENTS

| | | |
|---|---|---|
| 8,856,748 B1 | 10/2014 | Larsen et al. |
| 9,009,677 B2 | 4/2015 | Zhao et al. |
| 9,104,794 B2 | 8/2015 | Zakonov et al. |
| 9,286,063 B2 | 3/2016 | Kriegsman et al. |
| 9,785,461 B2 | 10/2017 | Anerousis et al. |
| 10,083,029 B2 | 9/2018 | Odvody et al. |
| 10,216,485 B2 | 2/2019 | Misra et al. |
| 10,264,101 B2 | 4/2019 | Blank |
| 10,691,810 B1 | 6/2020 | Freitag et al. |
| 10,812,346 B1 | 10/2020 | Cross et al. |
| 10,862,779 B2 | 12/2020 | Sahoo et al. |
| 10,911,408 B2 | 2/2021 | Naik et al. |
| 10,924,410 B1 | 2/2021 | Nee et al. |
| 10,965,736 B2 | 3/2021 | Orman |
| 11,030,068 B1 | 6/2021 | Agarwal et al. |
| 11,178,034 B1 | 11/2021 | Joshi et al. |
| 11,343,355 B1 | 5/2022 | Goela et al. |
| 11,354,131 B2 | 6/2022 | Balasubramanian et al. |
| 11,409,507 B1 | 8/2022 | Shepherd |
| 11,438,278 B2 | 9/2022 | Gnaneswaran et al. |
| 11,463,478 B2 | 10/2022 | Nadgowda et al. |
| 11,714,629 B2 | 8/2023 | Shaastry et al. |
| 2005/0047556 A1 | 3/2005 | Somerville et al. |
| 2010/0042582 A1 | 2/2010 | Aggarwal et al. |
| 2011/0066719 A1 | 3/2011 | Miryanov et al. |
| 2013/0166504 A1 | 6/2013 | Varkhedi et al. |
| 2015/0143355 A1 | 5/2015 | Tingstrom et al. |
| 2016/0162317 A1* | 6/2016 | Doherty ............ G06F 11/301 718/1 |
| 2018/0260301 A1* | 9/2018 | Podjarny ........... G06F 16/2379 |
| 2020/0202006 A1 | 6/2020 | Shah et al. |
| 2020/0257504 A1 | 8/2020 | Kadam et al. |
| 2021/0026756 A1* | 1/2021 | Magnezi ............ G06F 11/3688 |
| 2021/0089286 A1 | 3/2021 | Barkus et al. |
| 2022/0019522 A1* | 1/2022 | Jaros ................. G06F 11/3688 |
| 2022/0116292 A1 | 4/2022 | Madani et al. |
| 2023/0266989 A1* | 8/2023 | van Welzen ....... G06F 9/45558 718/1 |
| 2024/0160559 A1* | 5/2024 | Mietke .............. G06F 11/3664 |
| 2024/0338184 A1 | 10/2024 | Bendert et al. |

OTHER PUBLICATIONS

Wu, Yangyang, "Performance Modeling of Virtual Machine Live Migration", IEEE 4th International Conference on Cloud Computing, (Sep. 2011), 8 pgs.

"U.S. Appl. No. 18/295,554, Non Final Office Action mailed Oct. 1, 2024", 15 pgs.

"U.S. Appl. No. 18/295,554, Response filed Jan. 1, 2025 to Non-Final Office Action mailed Oct. 1, 2024", 10 pgs.

"U.S. Appl. No. 18/295,554, Notice of Allowance mailed Feb. 26, 2025", 12 pgs.

* cited by examiner

SOFTWARE DEPENDENCY MANAGEMENT AND TESTING SYSTEM

TECHNICAL FIELD

Embodiments pertain to software component testing tools. Some embodiments relate to management of software component dependency testing.

BACKGROUND

The performance of modern software components often depends upon both other software components as well as available hardware resources. Software dependencies may include standardized libraries, frameworks, toolkits, application programming interfaces (APIs), and the like. These dependencies may be components linked with the software component when the software code of the component is compiled or may be external software components that the software component communicates with or uses during run-time. Software dependencies may also extend to available hardware resources and operating environments. For example, the software component's performance may change based upon the hardware resources available to it. These hardware and software dependencies may in turn, have their own dependencies, which form a dependency chain.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Given potentially large dependency chains, managing these dependencies may be challenging. A change in one component in the middle of a large dependency chain may cause functionality issues with multiple different software components. For maintainers of these components, it becomes challenging to track these changes, to test these changes, and to document these changes. For software operating in high-risk environments, or in environments with significant regulatory oversight, any change in the dependency chain may need to be validated and that validation recorded. In these environments, even a minor change in a dependency may create massive testing efforts across a number of software components.

Disclosed in some examples are methods, systems, devices, and machine-readable mediums for managing the testing of software component dependencies. In some examples, the system may track versions of dependencies; provide an interface to create a customized testing environment—e.g., such as by allowing a user to select whether to include a particular dependency and what version of that dependency to include; select test scripts; select test environments; and automate tests of the selected versions. The system may log test results that can be used for proof of regulatory compliance. In some examples, the system may automate the testing of new dependency versions. For example, a new version of a dependency may automatically be tested by the system using one or more test scripts. The results may then be presented to one or more users.

In further examples, the system may provide recommendations related to dependencies. In some other examples, the system may analyze either the source code, object code, or execution behavior of a software component to determine dependency-related information. For example, a number of times a dependency was utilized, which particular functions of the dependency were utilized, and the like. This information may be provided to a user in a dashboard or GUI. Finally, the system may determine, for an updated dependency, given the dependency information and changes made to the dependency, a risk score or indication that describes a perceived risk of the change in the dependency. For example, if a functionality that changes is heavily used by the software component, a high risk score may be assigned; on the other hand, if the changes in the software dependency do not impact functionality heavily used by the software component, a lower risk score may be assigned. In still additional examples, changes made to another software component that utilizes similar portions of the updated dependency may be analyzed. Based upon that analysis, the system may then provide recommendations on how to update other software components that utilize the dependency similarly.

Figure 1:
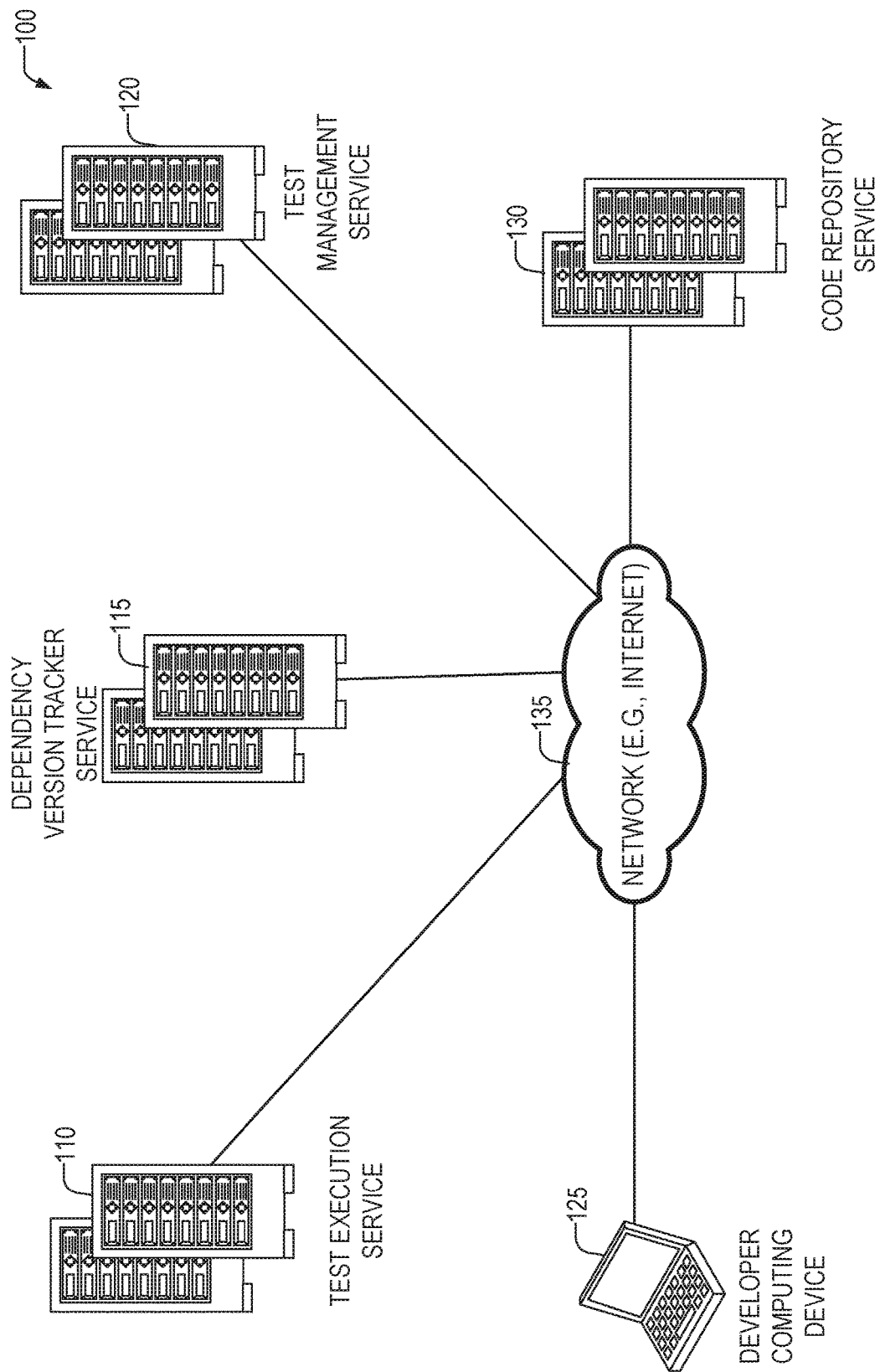
FIG. 1 illustrates a software component testing environment of some examples of the present disclosure.

FIG. 1 illustrates a software component testing environment 100 of some examples of the present disclosure. Developer computing device 125 may communicate with one or more computing services over a network 135. Network 135 may be a local network, such as a Local Area Network (LAN), a network that spans a wider area such as a Wide Area Network (WAN), the Internet, an Intranet, or the like. Testing environment 100 may include a software component test execution service 110 where network-based computing resources may be utilized by a developer to test one or more software components. The software component test execution service 110 may comprise hardware that is virtualized by virtualization software into one or more virtual machines. To test a software component without the test management service 120, the developer computing device 125 configures the test environment on the software component test execution service 110, transfers, or causes to be transferred, the software component to the software component test execution service 110 (e.g., from code repository service 130), and issues commands to begin the testing. The software component test execution service 110 allocates a virtual machine (which may include a software environment such as an operating system), launches a software environment (which may be specified by the developer computing device 125), executes the software component, and executes a test script. The results may be collected by the software component test execution service 110 and sent back to the developer computing device 125. Once the test is over, the software component test execution service 110 (e.g., based upon a command by the developer computing device 125) may release the virtual hardware resources and close the software environment so that another user may use those resources. Software environment may be a version of an operating system (O/S), one or more versions of one or more other software components, and the like.

Code repository service 130 may be a service that implements software source code control, such as storage and backup of software code; version management; access management; software defect management; software component code building services; and the like. In some examples, the software component may be loaded to the software component test execution service 110 from the code repository service 130. A software component may be directly executable instructions, interpretable instructions (e.g., a Java object), a script file, HyperText Markup Language (HTML) file, or the like. A software component may be an entire software application, a plug-in, or the like and may be directly executable or may be only executable as part of a larger application. In some examples, rather than a code repository service 130, the system may utilize one or more application stores that are databases of downloadable executable applications.

As noted, the software components may have one or more dependencies. For example, software frameworks that become part of the software component when compiled (e.g., by the code repository service), different Application Programming Interfaces (APIs), other software components that the software component communicates with or utilizes, and the like. Dependency version tracker service 115 may identify and track dependencies to one or more software components. For example, by analyzing source code, execution behavior, or by being provided the information by a user of the developer computing device 125. For example, the dependency version tracker service 115 may develop one or more dependency trees for one or more software components. The dependency trees may map software and/or hardware dependencies for each software component. The root node of the dependency tree may be the software component (which may be a dependency for a different software component). Nodes branching from the root node may be first degree dependencies. Nodes branching from the first-degree dependencies may be second-degree dependencies, and so on with the dependency degree of a particular dependency being a number of branches from the software component to the dependency.

Software dependency version tracker service 115 may track one or more versions of one or more software dependencies and/or changes to hardware resources used by the component. For example, by interfacing with one or more code repository services, such as code repository service 130, the system may determine when a new version of an object is released or predicted to be released and may notify administrators of other software components that depend on the software component with the new version. One or more changelogs or code differences that identify the changes made may also be identified and communicated to the administrators. In addition, the software dependency version tracker service 115 may notify the test management service 120. Software dependency version tracker service 115 may track changes to dependent hardware resources by communicating with one or more asset management services (not shown) to identify changes in hardware or operating system of devices used to execute the software component.

Test management service 120 may coordinate with code repository service 130, software component test execution service 110, software dependency version tracker service 115, and developer computing device 125 to test software components. For example, the test management service 120 may determine and/or track one or more dependencies and available versions of those dependencies by communicating with the dependency version tracker service 115. The test management service 120 may then provide one or more interfaces (e.g., such as GUIs) to a developer computing device 125. In some examples, the GUIs may provide a dashboard that shows which versions of which dependencies are available; which versions of each dependency have been tested and confirmed as functional; which versions of each dependency currently have known defects; which versions of each dependency have not yet been tested or completed testing; which versions of each dependency are used in production releases; and the like.

Developers may then initiate testing of the software component, through the interfaces (e.g., GUIs or APIs), by specifying the dependencies to load, the dependency versions, hardware information (e.g., a version of the hardware), operating system information, and the like. The test management service 120 may utilize these parameters, contact the code repository service 130 and cause the selected software components to be loaded to the software component test execution service 110 corresponding to the chosen dependencies and versions. The test management service 120 may allocate a virtual machine on the software component test execution service 110 matching the selected hardware information and operating system information. After the virtual machine is allocated the dependencies may be loaded and executed and the scripts may be executed.

In some examples, in addition to showing dependency versions and test status, the interfaces may provide information about dependency usage information such as how much a particular dependency is utilized in a component or across all (or a subset of all) components it tracks; trends showing which dependencies (e.g., globally across all software components managed by the test management service 120) are used most and whether that usage is increasing or decreasing, and the like.

In addition, the test management service 120 may automatically test a software component when one of its dependencies is updated. For example, the test management service 120 may be notified of a new version from the software dependency version tracker service 115. The test management service 120 may select a test environment using the new version of the dependency (which may be obtained from a code repository service such as code repository service 130) and may select one or more test scripts associated with the software component. The test scripts may be all the test scripts for the software component, or a subset of test scripts. The subset may be chosen to test the particular functionality related to the dependency that changed. The specific subset may be determined by a user and input as a setting into the test management service 120 or may be determined based upon an automatic analysis of the software component under test. For example, the test management service 120 may determine the portions of the software component that interface with the dependency and may select all test scripts that exercise those portions. The results of those tests may be presented in the dashboard, or otherwise sent to the developer computing device 125.

In still other examples, the test management service 120 may analyze other software components with a same dependency and determine if any of those other objects required updates related to the new version of the dependency. The other software components may be all software components with a same dependency, software components with similar dependencies, software components with similar usages of the changed dependency, or the like. Similarity may be determined using one or more machine-learning models. The changes from the other software components may be analyzed to determine the likely changes in the subject software component. For example, changes to, or near a function or API call to the dependency may be determined and presented to the developer. In some examples, code from before and after the software component that was changed may be used to train a machine learning model. The machine learning model may then be fed unmodified code to determine recommended changes to accommodate the update.

The components of FIG. 1, such as the developer computing device 125, dependency version tracker service 115, test execution service 110, code repository service 130, and test management service 124 are exemplary and one of ordinary skill in the art with the benefit of applicant's disclosure will appreciate that the functions performed by one of the components may be performed by a different component. Additionally, one of ordinary skill in the art with the benefit of applicant's disclosure will appreciate that one or more components may be combined, removed, split into multiple components, or the like.

Figure 2:
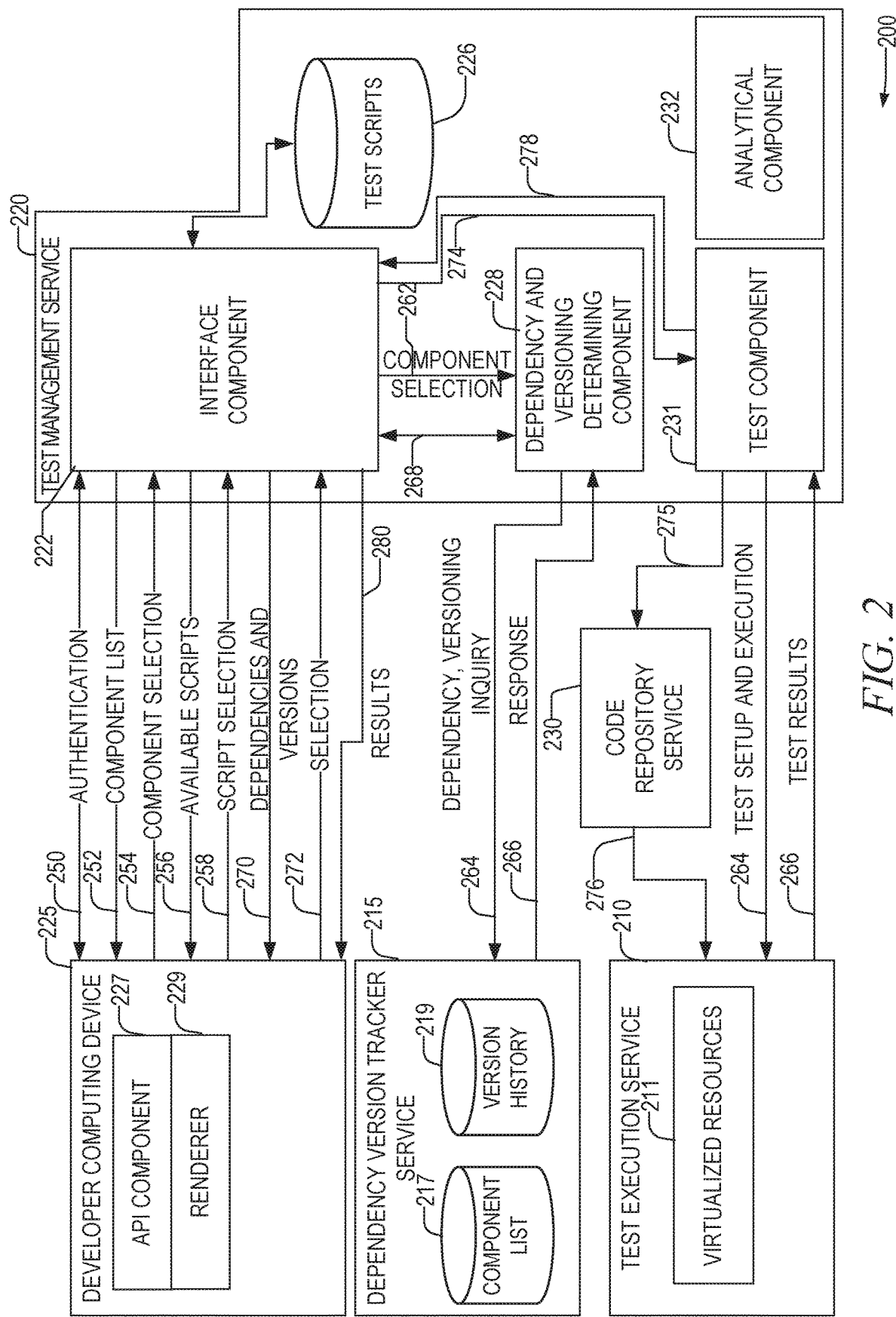
FIG. 2 illustrates a logical block diagram of a test management service, developer computing device, dependency version tracker service, code repository service, and test execution service along with a logical flow of executing tests on a software component according to some examples of the present disclosure.

FIG. 2 illustrates a logical block diagram 200 of a test management service 220, developer computing device 225, dependency version tracker service 215, code repository service 230, and software component test execution service 210 along with a logical flow of executing tests on a software component according to some examples of the present disclosure. Developer computing device 225, dependency version tracker service 215, software component test execution service 210, code repository service 230, and test management service 224 may be examples of developer computing device 125, dependency version tracker service 115, test execution service 110, code repository service 130, and test management service 124 in some examples.

The components of FIG. 2, such as the developer computing device 225, dependency version tracker service 215, software component test execution service 210, code repository service 230, and test management service 224 and the various subcomponents are exemplary and one of ordinary skill in the art with the benefit of applicant's disclosure will appreciate that the functions performed by one of the components may be performed by a different component. Additionally, one of ordinary skill in the art with the benefit of applicant's disclosure will appreciate that one or more components may be combined, removed, split into multiple components, or the like.

Developer computing device 225 may include one or more of an API component 227 and/or the renderer component 229. For example, renderer component 229 may be a browser application that renders documents-which may be sent to or from network-based services such as test management service 220. Developer computing device 225 may also, or instead of using renderer component 229, utilize API component 227 to access test management service 220. Test management service 220 may include an interface component 222 which may authenticate a user of developer computing device 225 using authentication messages 250. Authentication messages 250 may authenticate a user of the developer computing device 225, associate the user to an account on the test management service 220 and provide the user access (and restrict unauthorized users access) to software component testing provided by the test management service 220. Authorization may include the user providing a username and password for the test management service 220, or otherwise having the developer computing device 225 provide an authorization token or some other form of authentication.

In some examples, the user of the developer computing device 225 may communicate and configure the test management service 220 using GUIs. In these examples, one or more GUI descriptors are provided by the test management service 220 (e.g., over a network) that are rendered by the rendering component 229 to provide one or more GUIs to a user of the developer computing device 225. In other examples, the test management service 220 and developer computing device 225 may communicate using an Application Programming Interface (API) and API component 227. For example, the user of the developer computing device 225 may utilize a command line interface, a scripting interface, or the like to select options and configure the test management service 220 that are then converted to API messaging which is sent to the test management service 220. API component 227 may also be a dedicated application which provides a standalone GUI that utilizes the API of test management service 220 to interact with test management service 220. GUI descriptors may be one or more data structures or files that, when interpreted by an application, instruct the application to render a GUI. Example GUI descriptors include Hypertext Markup Language (HTML) files, extensible Markup Language (XML) files, script files, JavaScript files, Java files, Cascading Style Sheets (CSS), information for display in a specified GUI, and the like. Applications may include a browser or a dedicated application. The dedicated application may have portions of the GUI already specified in the instructions of the application that may be supplemented by information in the GUI descriptors.

A user of the developer computing device 225 may execute one or more tests on a software component—e.g., by selecting an option in a GUI or utilizing a command line interface. In some examples, the interface component 222 may send a component list with messaging 252 listing the software components registered by developers with the test management service and for which the user has been granted access to test. The user may select the component to test using messaging 254. The available scripts or test cases may be selected using messaging 258. The interface component 222 may then request a list of dependencies and versions of those dependencies for the selected component from the dependency and versioning determining component 228 using messaging 262. Dependency and versioning determining component 228 may use one or more APIs to send an inquiry using messaging 264 to dependency version tracker service 215. Dependency version tracker service 215 may consult a component list data store 217 which may store dependencies of components. Upon obtaining a list of dependencies, the dependency version tracker service 215 may consult a version history data store 219 to determine version histories and the latest versions of each of the dependencies. This information is passed back to the dependency and versioning determining component 228 using messaging 266.

The list of dependencies and versions may be sent by the dependency and versioning determining component 228 to interface component 222 using messaging 268. Interface component 222 may then provide the dependencies and versions of those dependencies to the developer computing device 225 with messaging 270. The user may select scripts or test to run with messaging 258 and dependencies and versions with messaging 272.

While separate messaging was used to select components, versions, and test scripts, in some examples, the messaging may be combined into fewer messages such that multiple configuration options may be selected within a single message, or in some other examples, default options may be utilized in the absence of a selection of a configuration option.

Interface component 222 then sends the selected software component to test, the scripts to run, the list of dependencies and the versions to use to the test component 231 using messaging 274. Note that in some examples, the user may wish to test the software component without a particular dependency—that is, a dependency may not be required to successfully execute a particular script or even for the entire functionality of the software component. Thus, the list of dependencies to use for the test may or may not be the same as the list of all dependencies of the software application.

Test component 231 then instructs the code repository service 230 using messaging 275 to send the software component and the selected software dependencies in the selected versions to the software component test execution service 210. The code repository service 230 provides these as software components using messaging 276. In some examples, the test component 231 receives the software components and provides them to the test execution service 210 rather than having the code repository service 230 provide them directly to the test execution service 210.

Test component 231 sets up the test environment, transfers software components (if not done by the code repository service 230 directly), transfers the test scripts, and instructs the software component test execution service 210 to execute the test scripts using messaging 264. Software component test execution service 210 may setup one or more virtualized resources 211 and may use those virtualized resources 211 to execute the requested tests. The results are sent back to the test component 231 in messaging 266. The results are passed back to the interface component 222 using messaging 278. Interface component 222 then provides the results to the developer computing device 225 using messaging 280. In some examples, the test component 230 may setup the environment based upon hardware dependencies. For example, hardware versions, hardware types, and other hardware configurations may be simulated by the test execution service based upon settings sent by test component 231.

Test scripts may be stored on developer computing device 225, test scripts data store 226 on test management service 220, code repository service 230, software component test execution service 210, or the like. In some examples, the developer computing device 225 may load test scripts to the test management service 220 prior to, or as part of test execution.

Test management service 220 may also include an analytical component 232. Analytical component 232 may determine one or more statistics about one or more dependencies. Example statistics include a number of software components with a certain dependency; historical usage trends for one or more dependencies (e.g., to view how many components have a particular dependency over time); a number of times a dependency is used or otherwise relied upon by a particular software component (determined by examining code or runtime behavior); a comparison of the number of times a dependency is used or otherwise relied upon by a particular software component (determined by examining code or runtime behavior) as compared with an average number of times the dependency is used for the average software component using the dependency; and the like.

Analytical component 232 may also create one or more dependency signatures for each dependency which map one or more aspects of how the dependency is utilized by the software component. Example aspects for software dependencies include which API calls of a dependency are exercised by the software application; how many times each particular API call is utilized; and the like. The signatures may be used to compare software components to find other software components with similar usages of the dependency. In the event of a new version of the dependency, the signature may allow the analytical component 232 to determine a likely impact of the change. For example, if an API call is modified in the change, software components that heavily rely upon that API call may have a high risk for impact; whereas software components that rarely or never rely upon that API call may have low risk. In addition to determining impact risk, upon detecting a change to a dependency, the analytical component 232 may identify similar software components based upon a similarity in usage of the dependency. Test results already performed on these similar software components may also be factored into a risk score for the change. Finally, the analytical component 232 may utilize changes made to these similar components to suggest changes to other software components based on these similar components.

Figure 3:
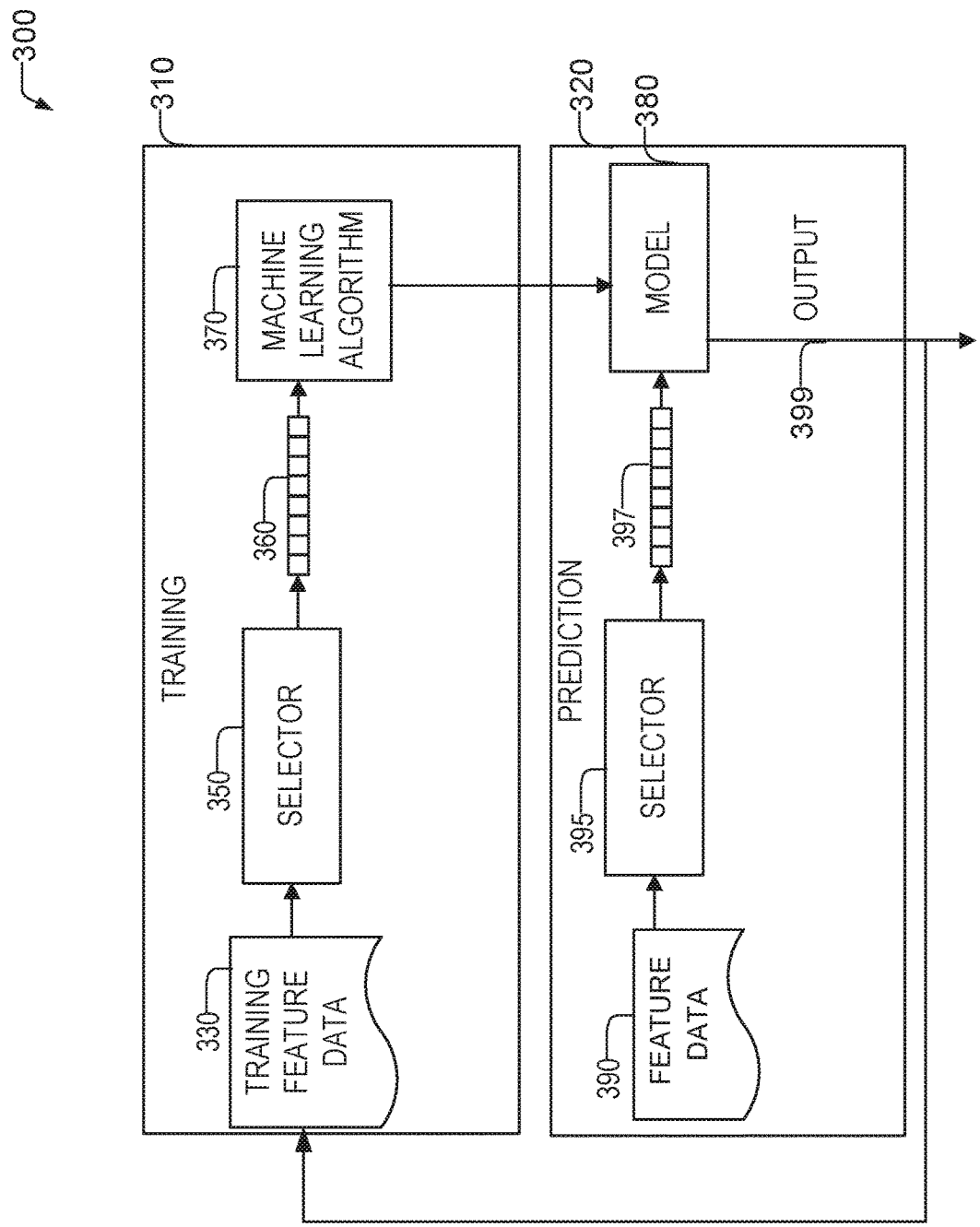
FIG. 3 shows an example machine learning module according to some examples of the present disclosure.

As previously noted, a test management service may utilize one or more machine-learning algorithms, for example, to determine similar usages of a dependency by one or more software components, determine recommended changes to make to accommodate a new version of a software dependency, determine a risk score for a new version of a software dependency, identify tests to run to determine whether a new version works properly, and the like. FIG. 3 shows an example machine learning module 300 according to some examples of the present disclosure. The machine learning module 300 may be implemented in whole or in part by one or more computing devices. In some examples, the training module 310 may be implemented by a different device than the prediction module 320. In these examples, the model 380 may be created on a first machine and then sent to a second machine. In some examples, one or more portions of the machine learning module 300 may be implemented by analytical component 232 from FIG. 2.

In some examples, machine learning module 300 utilizes a training module 310 and a prediction module 320. Training module 310 inputs training feature data 330 into selector module 350. The training feature data 330 may include one or more sets of training data. The training feature data 330 may be labeled with the desired output. In other examples, the training data may not be labeled, and the model may be trained using unsupervised methods and/or feedback data- such as through a reinforcement learning method. The feedback data may be a measure of error between a desired result of the algorithm and the actual result.

Selector module 350 converts and/or selects training vector 360 from the training feature data 330. For example, the selector module 350 may filter, select, transform, process, or otherwise convert the training data. For example, the selector module 350 may apply one or more feature selection algorithms to find features in the training data. The selected data may fill training vector 360 and comprises a set of the training data that is determined to be predictive of a result. Information chosen for inclusion in the training vector 360 may be all the training feature data 330 or in some examples, may be a subset of all the training feature data 330. Selector module 350 may also convert or otherwise process the training feature data 330 such as normalization, encoding, and the like. The training vector 360 may be utilized (along with any applicable labels) by the machine learning algorithm 370 to produce a model 380. In some examples, other data structures other than vectors may be used. The machine learning algorithm 370 may learn one or more layers of a model. Example layers may include convolutional layers, dropout layers, pooling/up sampling layers, SoftMax layers, and the like. Example models may be a neural network, where each layer is comprised of a plurality of neurons that take a plurality of inputs, weight the inputs, input the weighted inputs into an activation function to produce an output which may then be sent to another layer. Example activation functions may include a Rectified Linear Unit (ReLu), and the like. Layers of the model may be fully or partially connected.

In the prediction module 320, feature data 390 is input to the selector module 395. Selector module 395 may operate the same, or differently than selector module 350. In some examples, selector modules 350 and 395 are the same modules or different instances of the same module. Selector module 395 produces vector 397, which is input into the model 380 to produce an output 399. For example, the weightings and/or network structure learned by the training module 310 may be executed on the vector 397 by applying vector 397 to a first layer of the model 380 to produce inputs to a second layer of the model 380, and so on until the encoding is output. As previously noted, other data structures may be used other than a vector (e.g., a matrix).

The training module 310 may operate in an offline manner to train the model 380. The prediction module 320, however, may be designed to operate in an online manner. It should be noted that the model 380 may be periodically updated via additional training and/or user feedback. For example, additional training feature data 330 may be collected as users provide feedback on the performance of the predictions.

The machine learning algorithm 370 may be selected from among many different potential supervised or unsupervised machine learning algorithms. Examples of learning algorithms include artificial neural networks, Generative Pretrained Transformer (GPT), convolutional neural networks, Bayesian networks, instance-based learning, support vector machines, decision trees (e.g., Iterative Dichotomiser 3, C4.5, Classification and Regression Tree (CART), Chi-squared Automatic Interaction Detector (CHAID), and the like), random forests, linear classifiers, quadratic classifiers, k-nearest neighbor, k-means, linear regression, logistic regression, a region based CNN, a full CNN (for semantic segmentation), a mask R-CNN algorithm for instance segmentation, Latent Dirichlet Algorithm (LDA), and hidden Markov models. Examples of unsupervised learning algorithms include expectation-maximization algorithms, vector quantization, and information bottleneck method.

As noted, the machine-learning model may be used to determine applications that use a dependency similarly. In these examples, the training feature data 330 may be source code and/or dependency usage information—e.g., determined using run-time statistics (e.g., API calls of a dependency called by an application, frequency of usage, and the like). In some examples, the training data may be labelled to indicate which software components are similar. In other examples, an unsupervised learning method may be used that does not label training data or does not train the model. The feature data 390 may be a current software component's source code or dependency usage information. The output 399 in these examples is an identifier of a software component group that groups similar components. As noted, each group is specific to a dependency. Thus, a software component may be in multiple different groups—one group per dependency.

In some examples, the machine-learning model may be used to determine recommended changes to the code to accommodate a new version of a dependency. In some examples, the training feature data 330 may be source code of software components. In some examples, the training feature data 330 may be changes made for a new version of a particular dependency. The feature data 390 may be a software component that has not yet been updated for a new version of the particular dependency. The output 399 may be a description of changes to make to update the software component. In some examples, the training feature data 330 and/or the feature data 390 may also include a description of changes (e.g., either in descriptive text format, an API update, or source code changes) to the dependency. In some examples, the model 380 may be a GPT model.

In some examples, the machine-learning model may be used to determine a risk score for a new dependency version. In these examples, the training feature data 330 may be source code, test results of other components that use the dependency similarly, and/or dependency usage information—e.g., determined using run-time statistics (e.g., API calls of a dependency called by an application, frequency of usage, and the like). In some examples, the training data may be labelled to indicate whether the training data experienced defects with the new dependency. The feature data 390 may be source code and/or dependency usage information of a particular application for which a risk score is to be determined. The output 399 may be a risk score or classification.

Figure 4:
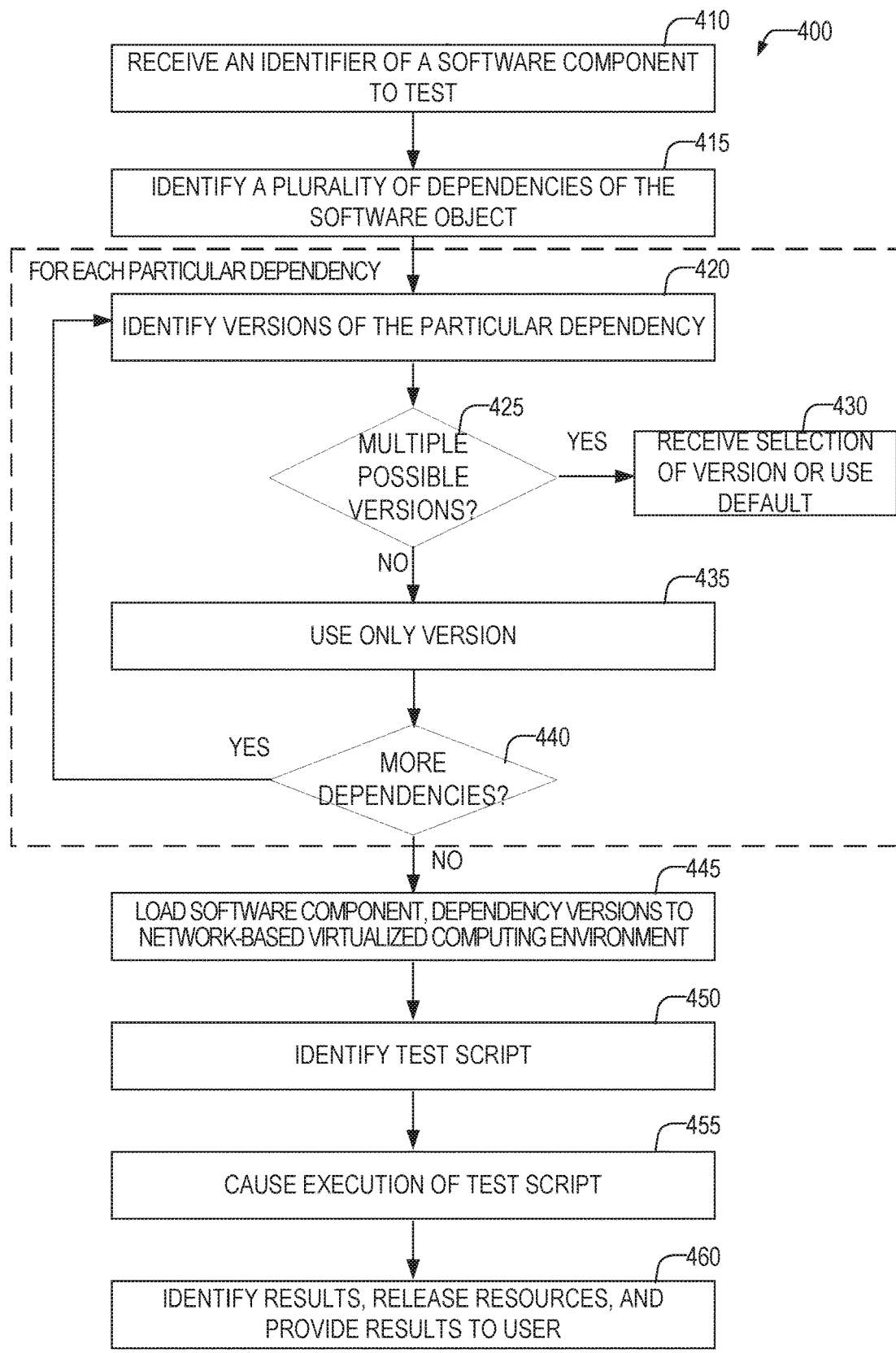
FIG. 4 illustrates a flowchart of a method of testing a software component using a test management service of the present disclosure.

FIG. 4 illustrates a flowchart of a method 400 of testing a software component using a test management service of the present disclosure. Method 400 may be performed by a test management service, such as test management services 120, 220. At operation 410 the test management service may receive an identifier of a software component to test. At operation 415, the test management service may identify a plurality of dependencies of the software component. For example, by contacting a dependency version tracker service. The user may also specify a subset of the plurality of dependencies of the software component to use for the test. In these examples, the operations following utilize the subset of the plurality of dependencies.

Operations 420, 425, 430, 435, and 440 are performed for each particular one of one or more of the dependencies identified in operation 415 or the subset of the plurality of dependencies specified by the user. At operation 420, the test management service identifies versions of the particular dependency. In some examples, the test management service identifies the versions by contacting the dependency version tracker service. At operation 425, the test management service determines if there are multiple versions. If there are multiple versions then at operation 430, the system receives a selection or uses a prespecified default version (depending on configuration settings). Selection may be a preselected default version, a selection entered by a user into a GUI, or a selection made by a user through a command line interface. If there are not multiple versions then at operation 435, the only version is designated for use. A determination is made at operation 440 if there are more dependencies to process. If there are, then flow proceeds back to operation

420. If all the dependencies are processed, then at operation 445, the test management service loads the software component and the dependencies and the specific versions of those dependencies selected in operations 420-440 to a network-based virtualized computing environment such as a virtual machine provided by a test execution service, such as text execution services 110, 210.

At operation 450, the system may identify a test script. For example, based upon user input, a schedule of testing operations, a preconfigured test script, or the like. At operation 455, the test management service may cause execution of the test script on the virtualized computing environment. The execution produces a result. At operation 460, the test management service identifies the result, releases the network-based virtualized computing environment resources, and provides the results to the user. For example, the results may be sent to the test management service by the test execution service. The test management service may then instruct the test execution service to release the resources of the virtualized computing environment. The results may be provided to the user via one or more GUIs or API results.

Figure 5:
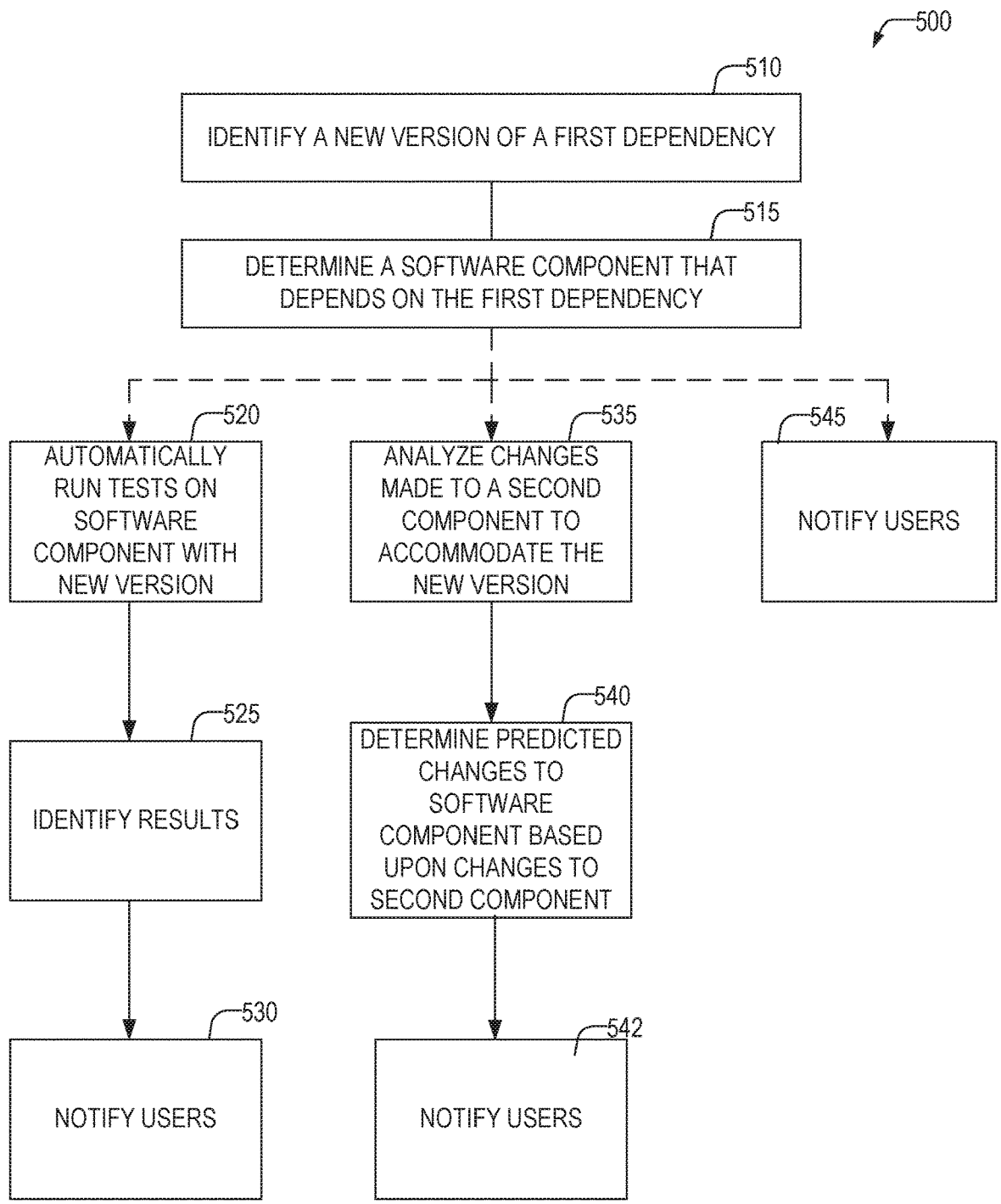
FIG. 5 illustrates a flowchart of a method of handling a new version of a dependency according to some examples of the present disclosure.

FIG. 5 illustrates a flowchart of a method 500 of handling a new version of a dependency according to some examples of the present disclosure. At operation 510, the test management service may identify a new version of a first dependency. For example, the dependency version tracker service 115 may notify the test management service 120—e.g., based upon a new version checked into a code repository service 130. At operation 515 the test management service may identify a software component that depends on the first dependency.

Depending on the configuration of the system—e.g., based upon user preferences or settings, the test management service may notify a user or administrator associated with the software component determined at operation 515 at operation 545. In other examples, and depending on a configuration setting, the system may automatically run one or more test scripts on the software component with the new version at operation 520; identify the results at operation 525; and notify users at operation 530. As already noted, the test scripts chosen may be based upon the changes made to the dependency such that the test scripts chosen may be scripts that exercise or otherwise utilize areas of the dependency that changed. Changes made to the dependency such that the test scripts chosen may be scripts that exercise or otherwise utilize areas of the dependency that changed may be determined based upon selecting scripts that show good coverage for functions or procedures that involve changes in the dependency using run-time analysis tools such as code coverage tools.

Another option for responding to a new dependency version is that the test management service may analyze changes made to a second component to accommodate the new version of the dependency at operation 535. At operation 540, the test management service may determine predicted changes to the component based upon the changes made to the second component. As previously described this may be accomplished using machine-learning models. At operation 542, the user may be notified of the suggested changes.

Other possible actions not shown for clarity include providing a risk rating or otherwise providing a recommendation as to whether the particular dependency will cause problems for the software component.

In some examples, the system may function with multiple versions of a particular software component so that users may evaluate dependency changes across a variety of different versions of the software component. In these examples, users may select the version to test. For automated actions, the test management service may select a current or latest version, all versions (e.g., repeat the automated actions for all versions), a prespecified number of last versions, or the like. As previously noted, the system may log test results for regulatory purposes.

Figure 6:
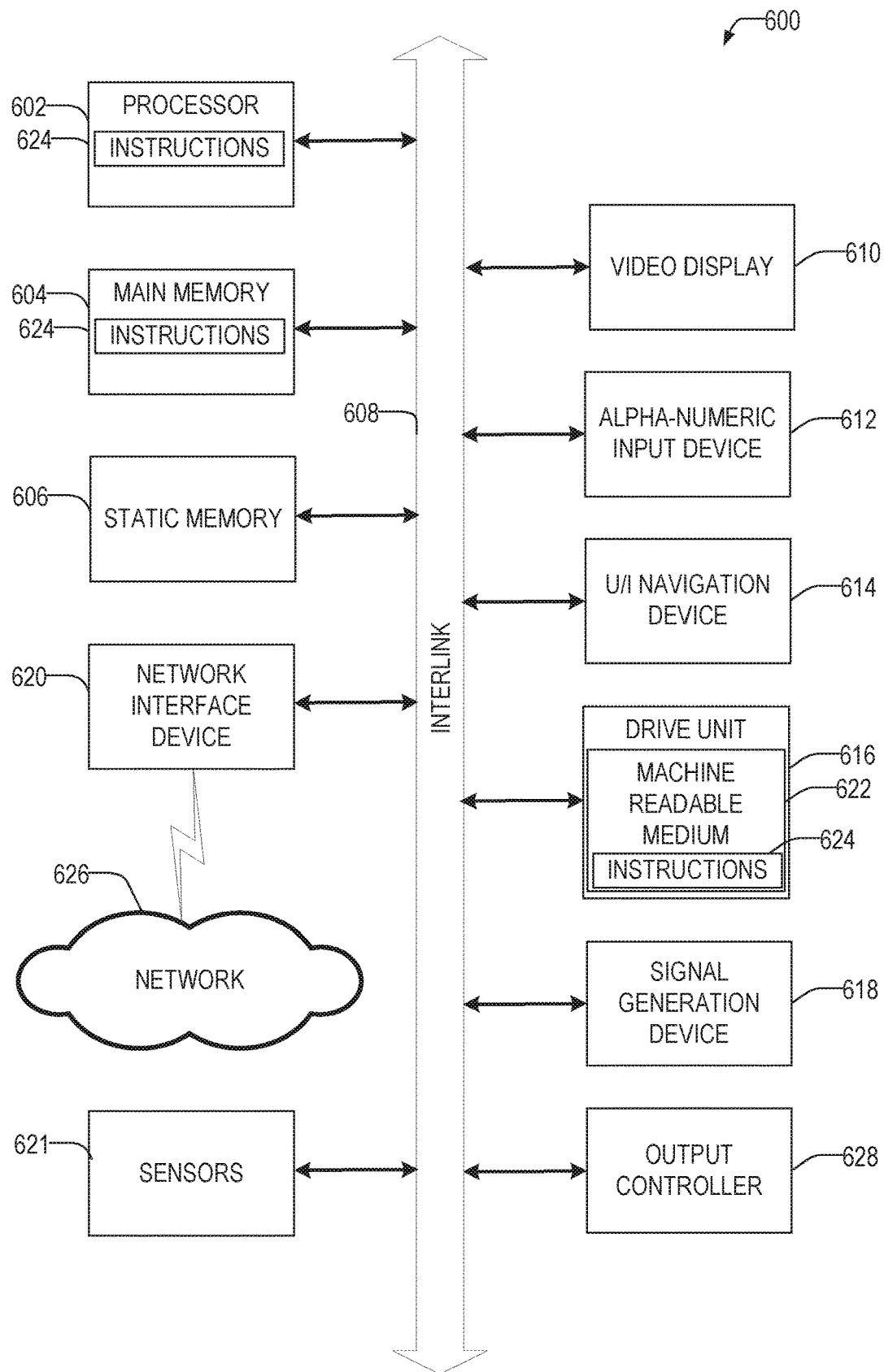
FIG. 6 is a block diagram illustrating an example of a machine upon which one or more embodiments may be implemented.

FIG. 6 illustrates a block diagram of an example machine 600 upon which any one or more of the techniques (e.g., methodologies) discussed herein may be performed. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be in the form of a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. Machine 600 may be configured to implement any one or more of the systems, services, and components of FIGS. 1-3 and the methods of FIGS. 4 and 5.

Examples, as described herein, may include, or may operate on one or more logic units, components, or mechanisms ("components"). Components are tangible entities (e.g., hardware) capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine readable medium. In an example, the software, when executed by the underlying hardware of the component, causes the hardware to perform the specified operations of the component.

Accordingly, the term "component" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which component are temporarily configured, each of the components need not be instantiated at any one moment in time. For example, where the components comprise a general-purpose hardware processor configured using software, the general-purpose hardware processor may be configured as respective different components at different times. Software may accordingly configure a hardware processor, for example, to constitute a particular module at one instance of time and to constitute a different component at a different instance of time.

Machine (e.g., computer system) 600 may include one or more hardware processors, such as processor 602. Processor 602 may be a central processing unit (CPU), a graphics processing unit (GPU), a hardware processor core, or any combination thereof. Machine 600 may include a main memory 604 and a static memory 606, some or all of which may communicate with each other via an interlink (e.g., bus) 608. Examples of main memory 604 may include Synchronous Dynamic Random-Access Memory (SDRAM), such as Double Data Rate memory, such as DDR4 or DDR5. Interlink 608 may be one or more different types of interlinks such that one or more components may be connected using a first type of interlink and one or more components may be connected using a second type of interlink. Example interlinks may include a memory bus, a peripheral component interconnect (PCI), a peripheral component interconnect express (PCIe) bus, a universal serial bus (USB), or the like.

The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 624 may further be transmitted or received over a communications network 626 using a transmission medium via the network interface device 620. The Machine 600 may communicate with one or more other machines wired or wirelessly utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks such as an Institute of Electrical and Electronics Engineers (IEEE) 802.11 family of standards known as Wi-Fi®, an IEEE 802.15.4 family of standards, a 5G New Radio (NR) family of standards, a Long Term Evolution (LTE) family of standards, a Universal Mobile Telecommunications System (UMTS) family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques.

OTHER NOTES AND EXAMPLES

Example 1 is a method of testing software components, the method comprising: using one or more hardware processors of a computing device: receiving an identifier of a software component to test; identifying a plurality of dependencies of the software component; identifying that a first dependency of the plurality of dependencies has a plurality of versions; receiving a selection of a version of the plurality of versions of the first dependency; loading the software component and the plurality of dependencies, including the selected version of the first dependency into resources of a network-based virtualized computing environment provided by a network-based computing service; identifying a test script; causing execution of the test script on the software component within the network-based virtualized computing environment to produce a first result; and releasing the resources of the network-based virtualized computing environment after execution of the test script.

In Example 2, the subject matter of Example 1 includes, identifying, within source code of the software component, a number of usages of an application programming interface (API) of the first dependency; determining that the number of usages exceeds a specified threshold; and responsive to determining that the number of usages exceeds the specified threshold, generating an alert to a user.

In Example 3, the subject matter of Examples 1-2 includes, providing a graphical user interface (GUI) that lists the plurality of dependencies, versions of each of the plurality of dependencies, and provides selectable controls to select different versions of each of the plurality of dependencies for ones of the plurality of dependencies that have multiple versions.

In Example 4, the subject matter of Example 3 includes, wherein the selection of the version of the plurality of versions of the first dependency is received through one of the selectable controls of the GUI.

In Example 5, the subject matter of Examples 1-4 includes, automatically: loading the software component and the plurality of dependencies, including a different version of the first dependency into the network-based virtualized computing environment; executing the test script on the software component to produce a second result; comparing the first and the second result; and displaying results of the comparing.

In Example 6, the subject matter of Examples 1-5 includes, wherein the selection of the version of the plurality of versions of the first dependency is received through a script file.

In Example 7, the subject matter of Examples 1-6 includes, subsequent to executing the test script, automatically identifying a new version of the first dependency, the new version newer than the selected version, the new version becoming available after the execution of the test script; responsive to identifying the new version, providing a notification that the new version is available; receiving an input to use the new version; and responsive to receiving the input: loading the software component and the plurality of dependencies, including the new version of the first dependency into the virtualized computing environment; executing the test script on the software component within the virtualized computing environment to produce a second result; comparing the first and second result; and displaying results of the comparing.

Example 8 is a computing device for testing software components, the device comprising: a hardware processor; a memory, the memory storing instructions, which when executed by the hardware processor, causes the computing device to perform operations comprising: receiving an identifier of a software component to test; identifying a plurality of dependencies of the software component; identifying that a first dependency of the plurality of dependencies has a plurality of versions; receiving a selection of a version of the plurality of versions of the first dependency; loading the software component and the plurality of dependencies, including the selected version of the first dependency into resources of a network-based virtualized computing environment provided by a network-based computing service; identifying a test script; causing execution of the test script on the software component within the network-based virtualized computing environment to produce a first result; and releasing the resources of the network-based virtualized computing environment after execution of the test script.

In Example 9, the subject matter of Example 8 includes, wherein the operations further comprise: identifying, within source code of the software component, a number of usages of an application programming interface (API) of the first dependency; determining that the number of usages exceeds a specified threshold; and responsive to determining that the number of usages exceeds the specified threshold, generating an alert to a user.

In Example 10, the subject matter of Examples 8-9 includes, wherein the operations further comprise: providing a graphical user interface (GUI) that lists the plurality of dependencies, versions of each of the plurality of dependencies, and provides selectable controls to select different versions of each of the plurality of dependencies for ones of the plurality of dependencies that have multiple versions.

In Example 11, the subject matter of Example 10 includes, wherein the selection of the version of the plurality of versions of the first dependency is received through one of the selectable controls of the GUI.

In Example 12, the subject matter of Examples 8-11 includes, wherein the operations further comprise: automatically: loading the software component and the plurality of dependencies, including a different version of the first dependency into the network-based virtualized computing environment; executing the test script on the software component to produce a second result; comparing the first and the second result; and displaying results of the comparing.

In Example 13, the subject matter of Examples 8-12 includes, wherein the selection of the version of the plurality of versions of the first dependency is received through a script file.

In Example 14, the subject matter of Examples 8-13 includes, wherein the operations further comprise: subsequent to executing the test script, automatically identifying a new version of the first dependency, the new version newer than the selected version, the new version becoming available after the execution of the test script; responsive to identifying the new version, providing a notification that the new version is available; receiving an input to use the new version; and responsive to receiving the input: loading the software component and the plurality of dependencies, including the new version of the first dependency into the virtualized computing environment; executing the test script on the software component within the virtualized computing environment to produce a second result; comparing the first and second result; and displaying results of the comparing.

Example 15 is a non-transitory machine-readable medium, storing instructions for testing software components, the instructions, when executed by a computing device, causes the computing device to perform operations comprising: receiving an identifier of a software component to test; identifying a plurality of dependencies of the software component; identifying that a first dependency of the plurality of dependencies has a plurality of versions; receiving a selection of a version of the plurality of versions of the first dependency; loading the software component and the plurality of dependencies, including the selected version of the first dependency into resources of a network-based virtualized computing environment provided by a network-based computing service; identifying a test script; causing execution of the test script on the software component within the network-based virtualized computing environment to produce a first result; and releasing the resources of the network-based virtualized computing environment after execution of the test script.

In Example 16, the subject matter of Example 15 includes, wherein the operations further comprise: identifying, within source code of the software component, a number of usages of an application programming interface (API) of the first dependency; determining that the number of usages exceeds a specified threshold; and responsive to determining that the number of usages exceeds the specified threshold, generating an alert to a user.

In Example 17, the subject matter of Examples 15-16 includes, wherein the operations further comprise: providing a graphical user interface (GUI) that lists the plurality of dependencies, versions of each of the plurality of dependencies, and provides selectable controls to select different versions of each of the plurality of dependencies for ones of the plurality of dependencies that have multiple versions.

In Example 18, the subject matter of Example 17 includes, wherein the selection of the version of the plurality of versions of the first dependency is received through one of the selectable controls of the GUI.

In Example 19, the subject matter of Examples 15-18 includes, wherein the operations further comprise: automatically: loading the software component and the plurality of dependencies, including a different version of the first dependency into the network-based virtualized computing environment; executing the test script on the software component to produce a second result; comparing the first and the second result; and displaying results of the comparing.

In Example 20, the subject matter of Examples 15-19 includes, wherein the selection of the version of the plurality of versions of the first dependency is received through a script file.

In Example 21, the subject matter of Examples 15-20 includes, wherein the operations further comprise: subsequent to executing the test script, automatically identifying a new version of the first dependency, the new version newer than the selected version, the new version becoming available after the execution of the test script; responsive to identifying the new version, providing a notification that the new version is available; receiving an input to use the new version; and responsive to receiving the input: loading the software component and the plurality of dependencies, including the new version of the first dependency into the virtualized computing environment; executing the test script on the software component within the virtualized computing environment to produce a second result; comparing the first and second result; and displaying results of the comparing.

Example 22 is at least one machine-readable medium including instructions that, when executed by processing circuitry, cause the processing circuitry to perform operations to implement of any of Examples 1-21.

Example 23 is an apparatus comprising means to implement of any of Examples 1-21.

Example 24 is a system to implement of any of Examples 1-21.

Example 25 is a method to implement of any of Examples 1-21.

What is claimed is:

1. A method of testing software components, the method comprising:
   using one or more hardware processors of a computing device;
   receiving an identifier of a software component to test;
   identifying a plurality of dependencies of the software component;
   identifying that a first dependency of the plurality of dependencies has a plurality of versions;
   receiving a selection of a version of the plurality of versions of the first dependency;
   loading the software component and the plurality of dependencies, including the selected version of the first dependency into resources of a network-based virtualized computing environment provided by a network-based computing service;
   identifying a test script;
   causing execution of the test script on the software component within the network-based virtualized computing environment to produce a first result;
   releasing the resources of the network-based virtualized computing environment after execution of the test script;
   identifying, within source code of the software component, a number of usages of an application programming interface (API) of the first dependency;
   determining that the number of usages exceeds a specified threshold; and
   responsive to determining that the number of usages exceeds the specified threshold, generating an alert to a user.

2. The method of claim 1, further comprising:
   providing a graphical user interface (GUI) that lists the plurality of dependencies, versions of each of the plurality of dependencies, and provides selectable controls to select different versions of each of the plurality of dependencies for ones of the plurality of dependencies that have multiple versions.

3. The method of claim 2, wherein the selection of the version of the plurality of versions of the first dependency is received through one of the selectable controls of the GUI.

4. The method of claim 1, further comprising:
   automatically:
   loading the software component and the plurality of dependencies, including a different version of the first dependency into the network-based virtualized computing environment;
   executing the test script on the software component to produce a second result;
   comparing the first and the second result; and
   displaying results of the comparing.

5. The method of claim 1, wherein the selection of the version of the plurality of versions of the first dependency is received through a script file.

6. The method of claim 1, further comprising:
   subsequent to executing the test script, automatically identifying a new version of the first dependency, the new version newer than the selected version, the new version becoming available after the execution of the test script;
   responsive to identifying the new version, providing a notification that the new version is available;
   receiving an input to use the new version; and
   responsive to receiving the input:
   loading the software component and the plurality of dependencies, including the new version of the first dependency into the virtualized computing environment;
   executing the test script on the software component within the virtualized computing environment to produce a second result;
   comparing the first and second result; and
   displaying results of the comparing.

7. A computing device for testing software components, the device comprising:
   a hardware processor;

a memory, the memory storing instructions, which when executed by the hardware processor, causes the computing device to perform operations comprising:
receiving an identifier of a software component to test;
identifying a plurality of dependencies of the software component;
identifying that a first dependency of the plurality of dependencies has a plurality of versions;
receiving a selection of a version of the plurality of versions of the first dependency;
loading the software component and the plurality of dependencies, including the selected version of the first dependency into resources of a network-based virtualized computing environment provided by a network-based computing service;
identifying a test script;
causing execution of the test script on the software component within the network-based virtualized computing environment to produce a first result;
releasing the resources of the network-based virtualized computing environment after execution of the test script; and
identifying, within source code of the software component, a number of usages of an application programming interface (API) of the first dependency;
determining that the number of usages exceeds a specified threshold; and
responsive to determining that the number of usages exceeds the specified threshold, generating an alert to a user.

8. The computing device of claim 7, wherein the operations further comprise:
providing a graphical user interface (GUI) that lists the plurality of dependencies, versions of each of the plurality of dependencies, and provides selectable controls to select different versions of each of the plurality of dependencies for ones of the plurality of dependencies that have multiple versions.

9. The computing device of claim 8, wherein the selection of the version of the plurality of versions of the first dependency is received through one of the selectable controls of the GUI.

10. The computing device of claim 7, wherein the operations further comprise:
automatically:
loading the software component and the plurality of dependencies, including a different version of the first dependency into the network-based virtualized computing environment;
executing the test script on the software component to produce a second result;
comparing the first and the second result; and
displaying results of the comparing.

11. The computing device of claim 7, wherein the selection of the version of the plurality of versions of the first dependency is received through a script file.

12. The computing device of claim 7, wherein the operations further comprise:
subsequent to executing the test script, automatically identifying a new version of the first dependency, the new version newer than the selected version, the new version becoming available after the execution of the test script;
responsive to identifying the new version, providing a notification that the new version is available;
receiving an input to use the new version; and
responsive to receiving the input:
loading the software component and the plurality of dependencies, including the new version of the first dependency into the virtualized computing environment;
executing the test script on the software component within the virtualized computing environment to produce a second result;
comparing the first and second result; and
displaying results of the comparing.

13. A non-transitory machine-readable medium, storing instructions for testing software components, the instructions, when executed by a computing device, causes the computing device to perform operations comprising:
receiving an identifier of a software component to test;
identifying a plurality of dependencies of the software component;
identifying that a first dependency of the plurality of dependencies has a plurality of versions;
receiving a selection of a version of the plurality of versions of the first dependency;
loading the software component and the plurality of dependencies, including the selected version of the first dependency into resources of a network-based virtualized computing environment provided by a network-based computing service;
identifying a test script;
causing execution of the test script on the software component within the network-based virtualized computing environment to produce a first result;
releasing the resources of the network-based virtualized computing environment after execution of the test script;
identifying, within source code of the software component, a number of usages of an application programming interface (API) of the first dependency;
determining that the number of usages exceeds a specified threshold; and
responsive to determining that the number of usages exceeds the specified threshold, generating an alert to a user.

14. The non-transitory machine-readable medium of claim 13, wherein the operations further comprise:
providing a graphical user interface (GUI) that lists the plurality of dependencies, versions of each of the plurality of dependencies, and provides selectable controls to select different versions of each of the plurality of dependencies for ones of the plurality of dependencies that have multiple versions.

15. The non-transitory machine-readable medium of claim 14, wherein the selection of the version of the plurality of versions of the first dependency is received through one of the selectable controls of the GUI.

16. The non-transitory machine-readable medium of claim 13, wherein the operations further comprise:
automatically:
loading the software component and the plurality of dependencies, including a different version of the first dependency into the network-based virtualized computing environment;
executing the test script on the software component to produce a second result;
comparing the first and the second result; and
displaying results of the comparing.

17. The non-transitory machine-readable medium of claim 13, wherein the selection of the version of the plurality of versions of the first dependency is received through a script file.

18. The non-transitory machine-readable medium of claim 13, wherein the operations further comprise:
   subsequent to executing the test script, automatically identifying a new version of the first dependency, the new version newer than the selected version, the new version becoming available after the execution of the test script;
   responsive to identifying the new version, providing a notification that the new version is available;
   receiving an input to use the new version; and
   responsive to receiving the input:
   loading the software component and the plurality of dependencies, including the new version of the first dependency into the virtualized computing environment;
   executing the test script on the software component within the virtualized computing environment to produce a second result;
   comparing the first and second result; and
   displaying results of the comparing.

* * * * *